(No Model.)
J. C. HIGGINS.
HORSESHOE CALK.
No. 567,139. Patented Sept. 8, 1896.
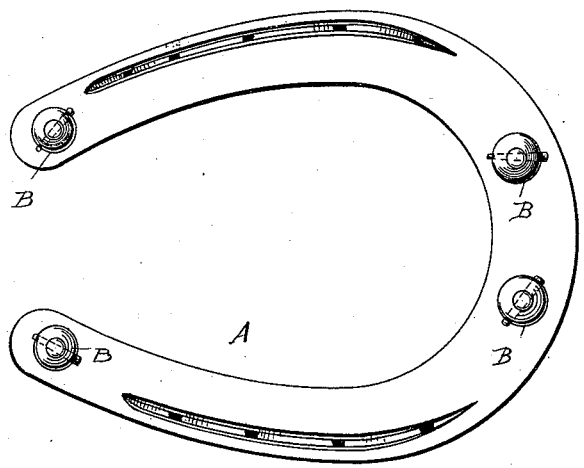
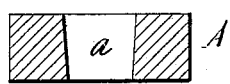
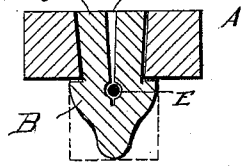
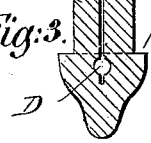
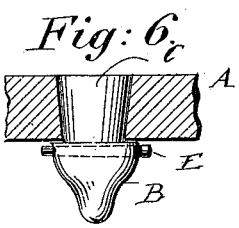
WITNESSES:
INVENTOR
J. C. Higgins
BY
ATTORNEYS.

United States Patent Office.

JOSEPH C. HIGGINS, OF NEW BRUNSWICK, NEW JERSEY, ASSIGNOR OF TWO-THIRDS TO A. VAN NEST BALDWIN AND THOMAS LEA, OF SAME PLACE.

HORSESHOE-CALK.

SPECIFICATION forming part of Letters Patent No. 567,139, dated September 8, 1896.

Application filed January 19, 1894. Renewed February 11, 1896. Serial No. 578,955. (No model.)

*To all whom it may concern:*

Be it known that I, JOSEPH C. HIGGINS, a citizen of the United States, and a resident of New Brunswick, in the county of Middlesex and State of New Jersey, have invented certain new and useful Improvements in Horseshoe-Calks, of which the following is a specification.

The object of my invention is to provide a new and improved horseshoe-calk which can readily be securely fastened in the shoe and can readily be removed when worn off to be replaced by a new calk.

The invention consists in a horseshoe-calk having a shank and provided with a transverse aperture directly below the top of the calk and a slit extending to the top of the shank, a pin being driven into the transverse aperture to spread the shank after it has been inserted into a tapered aperture in the shoe.

In the accompanying drawings, Figure 1 is a view of the under side of a horseshoe provided with my improved detachable calks. Fig. 2 is an enlarged detail vertical transverse sectional view through the shoe at the calk-hole. Fig. 3 is a detail side view of the calk detached. Fig. 4 is a detail side view of the expanding-pin. Fig. 5 is a detail vertical transverse sectional view through the shoe and calk, and Fig. 6 is a sectional view at right angles to Fig. 5.

Similar letters of reference indicate like parts.

The horseshoe A, which is made flat in the usual manner, without toe or heel calks, is provided at the toe with two apertures $a$ and a like aperture at each heel, said apertures extending through the thickness of the shoe and being slightly tapered from the upper to the lower surface of the shoe.

The calk B, made of steel, is tapered or pointed, as shown in Figs. 5 and 6, or made cylindrical, as shown in dotted lines in Fig. 5, and is provided with a cylindrical shank C at its top, the diameter of which shank is less than the diameter of the top of the calk proper and a trifle less than the bottom diameter of an aperture $a$.

A short distance below the shank C the calk is provided with a transverse slightly-tapering aperture D for receiving a tapering expanding-pin E.

The shank and calk are provided with a vertical slit F, extending transversely through the shank and calk from the top of the neck to a point slightly below the aperture D.

To apply and fasten a calk, its shank C is inserted or driven into an aperture $a$ until the top of the calk rests snugly against the under side of the shoe and then the pin E is driven into the aperture D to expand the shank C within the aperture $a$, as shown in Fig. 5, whereby the calk is held firmly and securely on the shoe.

To remove a calk preparatory to replacing it by a new calk, the pin E is removed by means of a cold-chisel applied on the calk directly adjacent to the bottom of the shoe, the bottom parts of the shank are driven together, and the calk drops out.

Having thus described my invention, what I claim as new, and desire to secure by Letters Patent, is—

1. A horseshoe-calk, made of a single piece of steel and provided with a shank projecting upwardly from the top of the calk, the calk being provided with a transverse aperture directly below its top and with a slit extending from the top of the shank to a point slightly below the aperture, substantially as set forth.

2. The combination, with a horseshoe having an aperture tapered from the upper to the lower surface of the shoe, of a calk made of a single piece of steel and having a cylindrical shank projecting upwardly from the top of the calk, a transverse aperture in the calk below the shank, and a slit extending from the top of the shank down through the same to a point slightly below said aperture, and an expanding-pin which is driven into the transverse aperture of the calk to spread the shank after the same has been inserted into the aperture of the shoe, substantially as set forth.

In testimony that I claim the foregoing as my invention I have signed my name in presence of two subscribing witnesses.

JOSEPH C. HIGGINS.

Witnesses:
OSCAR F. GUNZ,
K. R. BRENNAN.